US010491519B2

(12) United States Patent
Yin et al.

(10) Patent No.: US 10,491,519 B2
(45) Date of Patent: Nov. 26, 2019

(54) ROUTING METHOD, DEVICE, AND SYSTEM

(71) Applicant: Huawei Technologies Co., Ltd., Shenzhen (CN)

(72) Inventors: Yue Yin, Nanjing (CN); Feng Li, Nanjing (CN); Lei Han, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 79 days.

(21) Appl. No.: 15/084,259

(22) Filed: Mar. 29, 2016

(65) Prior Publication Data

US 2016/0212050 A1 Jul. 21, 2016

Related U.S. Application Data

(63) Continuation of application No. PCT/CN2014/084410, filed on Aug. 14, 2014.

(30) Foreign Application Priority Data

Sep. 30, 2013 (CN) .......................... 2013 1 0466001

(51) Int. Cl.
*H04L 12/741* (2013.01)
*H04L 12/751* (2013.01)
(Continued)

(52) U.S. Cl.
CPC .......... *H04L 45/745* (2013.01); *H04L 41/083* (2013.01); *H04L 45/08* (2013.01);
(Continued)

(58) Field of Classification Search
CPC ... H04L 45/245; H04L 12/4633; H04L 45/02; H04L 45/46; Y02B 60/33
See application file for complete search history.

(56) References Cited

U.S. PATENT DOCUMENTS

| 7,274,658 B2 | 9/2007 | Bornstein et al. |
| 2005/0220096 A1 | 10/2005 | Friskney et al. |

(Continued)

FOREIGN PATENT DOCUMENTS

| CN | 101938421 A | 1/2011 |
| CN | 102055817 A | 5/2011 |

(Continued)

OTHER PUBLICATIONS

"OpenFlow Switch Specification," OpenFlow Spec, Version 1.3.2 (Wire Protocol 0x04), pp. 1-131, Open Networking Foundation, Palo Alto, California (Apr. 25, 2013).

*Primary Examiner* — Jung H Park
(74) *Attorney, Agent, or Firm* — Leydig, Voit & Mayer, Ltd.

(57) ABSTRACT

Embodiments of the present disclosure disclose a routing method, a device, and a system. A network node receives a service data packet; the network node searches a forwarding table according to an aggregation identifier, to obtain next-hop information, where the aggregation identifier is used to identify service data flows of one type, where the service data flows have a same network requirement type and a same destination, and the forwarding table includes the aggregation identifier and the next-hop information corresponding to the aggregation identifier; and the network node forwards the service data packet according to the obtained next-hop information. The embodiments of the present disclosure can significantly reduce a quantity of routing entries of a service routing node, reduce operation complexity, and improve routing and forwarding efficiency of a system.

14 Claims, 5 Drawing Sheets

(51) Int. Cl.
*H04L 12/721* (2013.01)
*H04L 29/06* (2006.01)
*H04L 12/24* (2006.01)
*H04L 12/715* (2013.01)

(52) U.S. Cl.
CPC .............. H04L 45/54 (2013.01); H04L 45/70 (2013.01); H04L 69/164 (2013.01); *H04L 45/64* (2013.01)

(56) References Cited

U.S. PATENT DOCUMENTS

| | | | |
|---|---|---|---|
| 2006/0165053 A1 | 7/2006 | Bhatnagar et al. | |
| 2007/0110048 A1 | 5/2007 | Voit et al. | |
| 2011/0134924 A1 | 6/2011 | Hewson et al. | |
| 2013/0194914 A1* | 8/2013 | Agarwal | H04L 45/245 370/225 |
| 2013/0297824 A1 | 11/2013 | Lan et al. | |
| 2015/0372911 A1* | 12/2015 | Yabusaki | H04L 67/34 709/226 |
| 2016/0197824 A1* | 7/2016 | Lin | H04L 12/6418 370/389 |

FOREIGN PATENT DOCUMENTS

| | | |
|---|---|---|
| CN | 102106125 A | 6/2011 |
| EP | 2597831 A1 | 5/2013 |
| GB | 2461955 A | 1/2010 |
| JP | 2002223235 A | 8/2002 |
| JP | 2004289647 A | 10/2004 |
| JP | 2006203904 A | 8/2006 |

\* cited by examiner

ROUTING METHOD, DEVICE, AND SYSTEM

CROSS-REFERENCE TO RELATED APPLICATIONS

This application is a continuation of International Patent Application No. PCT/CN2014/084410, filed Aug. 14, 2014, which claims priority to Chinese Patent Application No. 201310466001.0, filed Sep. 30, 2013, both of which are hereby incorporated by reference in their entireties.

TECHNICAL FIELD

Embodiments of the present disclosure relate to the communications field, and in particular, to a routing method, a device, and a system.

BACKGROUND

An overlay network is a computer network established over another network. Network nodes in the overlay network are connected by using virtual or logical links, which correspond to paths, and these paths may be connected on an underlay network by using multiple physical links. For example, a cloud computing network, a peer-to-peer network, and the like are overlay networks running over the Internet. The Internet is an overlay network initially established over a conventional telephony network. A Voice over Internet Protocol (VoIP) network that appears later is an overlay network established over the Internet.

Currently, an Internet protocol (IP) network bears a large quantity of different types of services, such as a video on-live service, a video on demand service, a VoIP service, and an online game service. Different services have different requirements on a network, for example, the online game service is most sensitive to a network delay, the video on-live service is most sensitive to network packet loss, and the video on demand service has a highest requirement on a network bandwidth. A shortest path or a lowest-cost path is obtained through routing calculation by using a conventional routing protocol such as Intermediate System to Intermediate System (IS-IS) or Open Shortest Path First (OSPF). However, most of the time, the shortest path or the lowest-cost path is not a preferable route meeting a network requirement of a service.

According to a current software defined networking (SDN) technology emerging in the industry, for example, OpenFlow, a large quantity of flow tables are generated by using a centralized control plane and are delivered to a network device that supports OpenFlow. For generation of these flow tables, particular flow tables may be generated according to different network requirements of services. However, in an existing network, a network device has large traffic and various types of services; therefore, the network device supporting OpenFlow needs an excessively large quantity of flow tables, which leads to a high requirement on storage performance of the network device; moreover, it takes a lot of time to search a flow table, thereby affecting execution efficiency of routing.

SUMMARY

Embodiments of the present disclosure provide a routing method, a device, and a system, which can significantly reduce a quantity of routing entries of a service routing node, reduce operation complexity, and improve routing and forwarding efficiency of a system.

According to a first aspect, an embodiment of the present disclosure provides a routing method, where the method includes:

receiving, by a network node, a service data packet;

searching, by the network node, a forwarding table according to an aggregation identifier, to obtain next-hop information, where the aggregation identifier is used to identify service data flows of one type, wherein the service data flows have a same network requirement type and a same destination, and the forwarding table includes the aggregation identifier and the next-hop information corresponding to the aggregation identifier; and forwarding, by the network node, the service data packet according to the obtained next-hop information.

According to a second aspect, an embodiment of the present disclosure provides a method for controlling intelligent routing, where the method includes:

generating, by a control entity, a forwarding table, where the forwarding table includes an aggregation identifier and next-hop information corresponding to the aggregation identifier, where the aggregation identifier is used to identify service data flows of one type, wherein the service data flows have a same network requirement type and a same destination; and sending, by the control entity, the forwarding table to a network node.

According to a third aspect, an embodiment of the present disclosure provides a network node, including:

a receiving unit, configured to receive a service data packet;

a forwarding table searching unit, configured to search a forwarding table according to an aggregation identifier, to obtain next-hop information, where the aggregation identifier is used to identify service data flows of one type, wherein the service data flows have a same network requirement type and a same destination, and the forwarding table includes the aggregation identifier and the next-hop information corresponding to the aggregation identifier; and a sending unit, configured to forward the service data packet according to the obtained next-hop information.

According to a fourth aspect, an embodiment of the present disclosure provides a control entity, arranged in a network in a centralized or distributed manner, where the control entity includes:

a receiving unit, configured to collect real-time network status information between multiple network nodes;

a processing unit, configured to generate a forwarding table according to the network status information, where the forwarding table includes an aggregation identifier and next-hop information corresponding to the aggregation identifier, where the aggregation identifier is used to identify service data flows of one type, wherein the service data flows have a same network requirement type and a same destination; and a sending unit, configured to send the forwarding table to a network node.

According to a fifth aspect, an embodiment of the present disclosure provides a network system, including:

the network node according to the third aspect of the embodiments of the present disclosure, the first possible implementation manner of the third aspect, the second possible implementation manner, or the third possible implementation manner; and a control entity, arranged in a network in a centralized or distributed manner, where the control entity further includes:

a receiving unit, configured to collect real-time network status information between multiple network nodes;

a processing unit, configured to generate a forwarding table according to the network status information, where the forwarding table includes an aggregation identifier and next-hop information corresponding to the aggregation identifier, where the aggregation identifier is used to identify service data flows of one type, wherein the service data flows have a same network requirement type and a same destination; and a sending unit, configured to send the forwarding table to the network node.

According to the embodiments of the present disclosure, a forwarding table is searched according to a network requirement aggregation identifier, to acquire next-hop information, and routing and forwarding are performed on a service data packet according to the acquired next-hop information. Therefore, a quantity of flow tables of a service routing node can be significantly reduced, operation complexity can be reduced, and routing and forwarding efficiency of a system can be improved.

DESCRIPTION OF EMBODIMENTS

Figure 1:
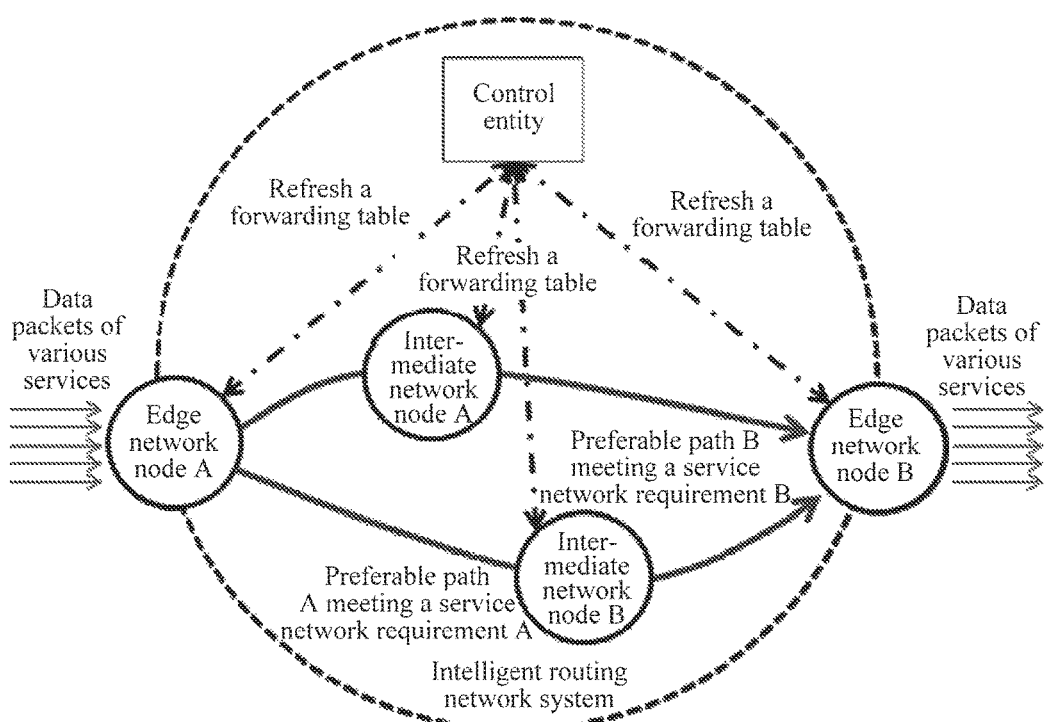
FIG. 1 is a schematic architectural diagram of a network system according to the present disclosure.

Referring to FIG. 1, FIG. 1 is a schematic architectural diagram of a system according to a first embodiment of the present disclosure, the intelligent routing network system includes multiple network nodes and a control entity. The network nodes include an edge network node A, an edge network node B, an intermediate network node A, and an intermediate network node B.

The control entity may be arranged in an intelligent routing network in a centralized or distributed manner. The control entity periodically collects real-time network status information between multiple network nodes, stores the real-time network status information in a database, generates a network requirement aggregation mapping table according to service subscription information, delivers the network requirement aggregation mapping table to an edge network node, then calculates, according to the real-time network statuses between the intelligent routing network nodes, information about a preferable path that is between any network node and another network node and that meets one or more types of service network requirements, generates a forwarding table according to the information about the preferable path, and provides all the intelligent routing network nodes with the forwarding information table.

The service subscription information refers to information on which an intelligent routing network system agrees with a service in advance to recognize the service and perform intelligent routing for the service, and includes a packet identifier of a subscribed service (for example, a domain name of a service, a uniform resource locator (URL) of a service, and an IP address of a server of a service), a network requirement type, and the like. The network requirement type includes a delay-sensitive type, a packet loss-sensitive type, a jitter-sensitive type, a bandwidth-sensitive type, a delay+bandwidth-sensitive type, a packet loss+delay-sensitive type, and the like. As shown in Table 1, network requirement type identifiers, such as Type A and Type B, separately correspond to types of different network requirements of service data packets.

TABLE 1

| Network requirement type | Network requirement type identifier |
| --- | --- |
| Delay-sensitive type | Type A |
| Packet loss-sensitive type | Type B |
| Jitter-sensitive type | Type C |
| Bandwidth-sensitive type | Type D |
| Delay + bandwidth-sensitive type | Type E |
| Packet loss + delay-sensitive type | Type F |
| . . . | . . . |

The network requirement aggregation mapping table is used to distinguish services having a same network requirement type and belonging to a same edge network node in the intelligent routing network system by using a same aggregation identifier. As shown in Table 2, Tags A, B, C, and D are aggregation identifiers. An aggregation identifier refers to an identifier for aggregating and categorizing traffic of various different service types, and includes a destination identifier and a network requirement type identifier, where the network requirement type identifier is used to identify a network requirement type of a service data packet, and the destination identifier may be a home destination identifier or a destination identifier of an original IP packet in the service data packet. A specific implementation manner may be a manner of extending the User Datagram Protocol (UDP), a manner of extending the IP protocol, a manner of adding a new field to a network packet, or the like. The home destination identifier refers to an identifier of a destination edge network node (that is, a last-hop network node) that a service server in the intelligent routing network system belongs to. In Table 2, Dest A and Dest B are home destination identifiers. The home destination identifier may be a node number, an IP address, a MAC address, or the like of an edge network node.

TABLE 2

| Packet identifier of subscribed service | Aggregation identifier |
| --- | --- |
| Server IP-SA1 of online game of enterprise A | Tag A (Dest A + Type A) |
| Server IP-SB1 of network mall of enterprise B | Tag A (Dest A + Type A) |
| Server IP-SC1 of network mall of enterprise C | Tag A (Dest A + Type A) |
| Server IP-SD1 of NBA live of enterprise D | Tag B (Dest A + Type B) |
| Server IP-SE1 of NBA live of enterprise E | Tag B (Dest A + Type B) |
| Server IP-SA2 of online game of enterprise A | Tag C (Dest B + Type A) |

TABLE 2-continued

| Packet identifier of subscribed service | Aggregation identifier |
|---|---|
| Server IP-SD2 of NBA live of enterprise D | Tag D (Dest B + Type B) |
| ... | ... |

As shown in Table 3, the forwarding table is used by a network node to search, by using an aggregation identifier (which includes a home destination identifier and a network requirement type identifier) as an index, for next-hop information (such as a node ID, an IP address, a MAC address of a next-hop network node, or a local port from which the service data packet is forwarded to a next-hop network node) which is routed and forwarded by the service data packet, and each network node has an independent forwarding table.

TABLE 3

| Aggregation identifier | Next-hop information |
|---|---|
| Tag A (Dest A + Type A) | IP b |
| Tag B (Dest A + Type B) | IP c |
| Tag C (Dest B + Type A) | IP d |
| Tag D (Dest B + Type B) | IP d |
| ... | ... |

An edge network node is a first-hop network node from which a service data packet enters the intelligent routing network system or a last-hop network node from which a service data packet leaves the intelligent routing network system. If an edge network node cannot find an aggregation identifier in a service data packet, the edge network node determines that the edge network node is a first-hop network node; if an edge network node determines, based on an aggregation identifier in a service data packet, that a home destination identifier included therein is the edge network node, the edge network node determines that the edge network node is a last-hop network node. After a first-hop network node (the edge network node A) determines that the first-hop network node is the first hop of the intelligent routing network system, the first-hop network node searches the network requirement aggregation mapping table by using service flow feature information (which may be a destination IP address, a source IP address, a destination IP address+a destination port, a quintet, or the like) of a service data packet, then adds an aggregation identifier to the service data packet, and then searches, based on the aggregation identifier, the forwarding table to perform path selection and forwarding. After a last-hop network node (the edge network node B) determines that the last-hop network node is the last hop of the intelligent routing network system, the last-hop network node removes the aggregation identifier in the service data packet, restores the service data packet to an original service data packet, and then forwards the original service data packet.

An intermediate network node is a non-edge network node and is responsible for searching, based on an "aggregation identifier" in a service data packet, the forwarding table to perform path selection and forwarding. Any physical network node in the system may not only act as an edge network node but may also act as an intermediate network node in different routing processes, but is either an edge network node or an intermediate network node in a particular routing process of a service data packet.

Figure 2:
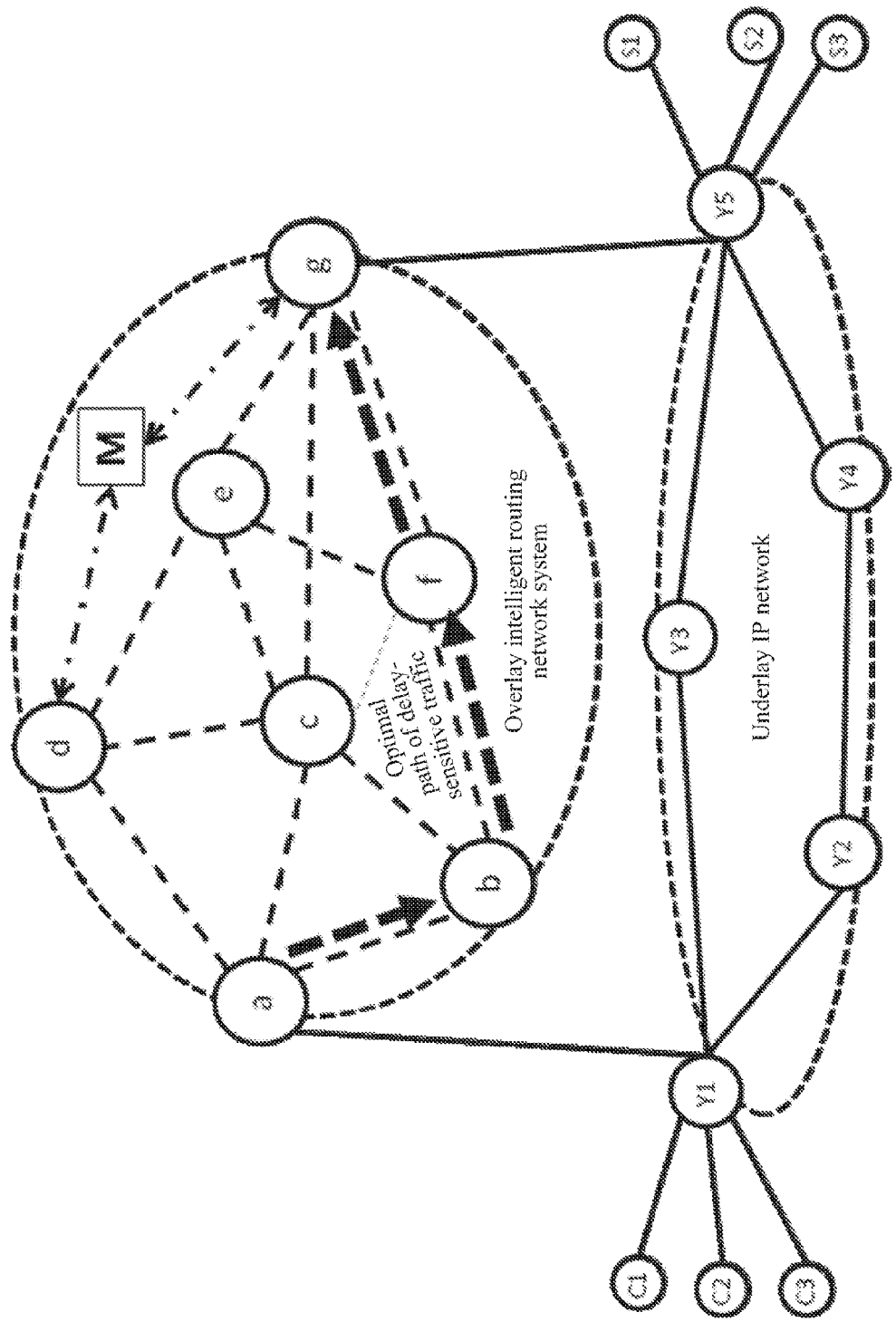
FIG. 2 is a schematic architectural diagram of a system according to a first embodiment of the present disclosure.

Referring to FIG. 2, FIG. 2 is a schematic architectural diagram of a system according to the first embodiment of the present disclosure, among network nodes on a conventional IP network of an underlay network of an intelligent routing network system of an overlay network in the present disclosure, network nodes Y1, Y2, Y3, Y4, and Y5 are network nodes located on the conventional IP network of the underlay network. Network nodes a, b, c, d, e, f, and g are intelligent routing network nodes on the overlay network. A control entity M is a control entity on the overlay network. Each node on the overlay network is directly or indirectly connected to a network node of the underlay network. For example, the network node a on the overlay network is directly connected to the network node Y1 on the underlay network, and the network node g on the overlay network is directly connected to the network node Y5 on the underlay network. Each of the other network nodes on the overlay network is directly or indirectly connected to a network node on the underlay network.

The network node a and the network node g are edge network nodes of the overlay network, and the network nodes b, c, d, e, and f are intermediate network nodes of the overlay network. Network nodes C1, C2, and C3 are clients of an online game service of an enterprise A, and network nodes S1, S2, and S3 are servers of the online game service of the enterprise A. An IP address of the network node C1 is IP-C1, and an IP address of the network node S1 is IP-SA1. A data packet of the network node C1 needs to be sent to the network node S1 via the intelligent routing network system, and a data packet of the network node S1 needs to be sent to the network node C1 via the intelligent routing network system.

Steps of a method according to the first embodiment of the present disclosure are as follows:

Step 1: The control entity M periodically collects real-time network statuses (for example, status information such as a network delay, a network packet loss, network jitter, and a network residual bandwidth between two network nodes) between multiple intelligent routing network nodes (for example, the network nodes a, b, c, d, e, f, and g), and stores the real-time network statuses in a database.

Step 2: The control entity M generates a network requirement aggregation mapping table according to subscription information of a service, and delivers a network requirement aggregation mapping table 4-1 to the edge network node a and delivers a network requirement aggregation mapping table 4-2 to the edge network node g. In this embodiment, a home destination identifier in an aggregation identifier Tag A is an IP address IP-g of the network node g.

TABLE 4-1

| Packet identifier of subscribed service | Aggregation identifier |
|---|---|
| Server IP-SA1 of online game of enterprise A | Tag A (IP-g + Type A) |
| Server IP-SB1 of network mall of enterprise B | Tag A (IP-g + Type A) |
| Server IP-SC1 of network mall of enterprise C | Tag A (IP-g + Type A) |
| Server IP-SD1 of NBA live of enterprise D | Tag B (IP-g + Type B) |
| Server IP-SE1 of NBA live of enterprise E | Tag B (IP-g + Type B) |
| Server IP-SA2 of online game of enterprise A | Tag C (IP-d + Type A) |

TABLE 4-1-continued

| Packet identifier of subscribed service | Aggregation identifier |
|---|---|
| Server IP-SD2 of NBA live of enterprise D | Tag D (IP-d + Type B) |
| ... | ... |

TABLE 4-2

| Packet identifier of subscribed service | Aggregation identifier |
|---|---|
| Server IP-SA1 of online game of enterprise A | Tag E (IP-a + Type A) |
| Server IP-SB1 of network mall of enterprise B | Tag E (IP-a + Type A) |
| Server IP-SC1 of network mall of enterprise C | Tag E (IP-a + Type A) |
| Server IP-SD1 of NBA live of enterprise D | Tag F (IP-a + Type B) |
| Server IP-SE1 of NBA live of enterprise E | Tag F (IP-a + Type B) |
| ... | ... |

Step 3: The control entity M calculates, according to the real-time network statuses between the intelligent routing network nodes, an optimal or a preferable path that is between a network node and another network node and that meets at least one network requirement type, and generates a forwarding table according to information about the optimal or preferable path, where the forwarding table includes an aggregation identifier and next-hop information corresponding to the aggregation identifier. The control entity M periodically actively provides the intelligent routing network nodes with forwarding tables, or provides the intelligent routing network nodes with forwarding tables according to requests of the network nodes, so that the intelligent routing network nodes search, by using the aggregation identifier as an index, for next-hop information which is routed and forwarded by the service data packet. For example, in this embodiment, as shown in FIG. 2, a path "network node a-network node b-network node f-network node g" is an optimal or a preferable path (a path having a relatively small delay), which satisfies a requirement that a server belongs to the network node g, of a delay-sensitive service within a current period in the intelligent routing network. A path "network node a-network node d-network node e-network node g" is a preferable path (a path having a relatively small packet loss rate), which satisfies a requirement that a server belongs to the network node g, of a packet loss-sensitive service within a current period in the intelligent routing network.

In this embodiment, forwarding tables, generated by the control entity M, of network nodes are exemplarily shown in Table 5-a, Table 5-b, Table 5-f, and Table 5-g. A forwarding table of another network node is omitted.

TABLE 5-a

| Aggregation identifier | Next-hop information |
|---|---|
| Tag A (IP-g + Type A) | IP b |
| Tag B (IP-g + Type B) | IP d |
| Tag D (IP-d + Type B) | IP d |
| Tag E (IP-a + Type A) | N/A |
| ... | ... |

TABLE 5-b

| Aggregation identifier | Next-hop information |
|---|---|
| Tag A (IP-g + Type A) | IP f |
| Tag B (IP-g + Type B) | IP c |
| Tag D (IP-d + Type B) | IP c |
| Tag E (IP-a + Type A) | IP a |
| ... | ... |

TABLE 5-f

| Aggregation identifier | Next-hop information |
|---|---|
| Tag A (IP-g + Type A) | IP g |
| Tag B (IP-g + Type B) | IP e |
| Tag D (IP-d + Type B) | IP c |
| Tag E (IP-a + Type A) | IP b |
| ... | ... |

TABLE 5-g

| Aggregation identifier | Next-hop information |
|---|---|
| Tag A (IP-g + Type A) | N/A |
| Tag B (IP-g + Type B) | N/A |
| Tag D (IP-d + Type B) | IP e |
| Tag E (IP-a + Type A) | IP f |
| ... | ... |

Step 4: The control entity M configures policy-based routing for the network node Y1 by interacting with a network management entity of the network node Y1 of the underlay network, and sends a data packet in the service data packet to the network node a in the intelligent routing network system, a destination IP address of the data packet is IP SA1. The control entity M configures policy-based routing for the network node Y5 by interacting with a network management entity of the network node Y5 of the underlay network, and sends a service data packet in which a source IP address is IP-SA1 to the network node g in the intelligent routing network system.

Step 5: After receiving the service data packet, the network node a determines that the network node a is a first-hop network node of the intelligent routing network system, then searches a network requirement aggregation mapping table (Table 4-1) of the network node a by using service flow feature information, for example, a destination IP address (IP-SA1) or a source IP address, in the service data packet, and finds that an aggregation identifier corresponding to the service data packet is Tag A; and then searches a forwarding table (refer to Table 5-a) based on the aggregation identifier Tag A, and learns that next-hop information is IP-b.

Figure 3:
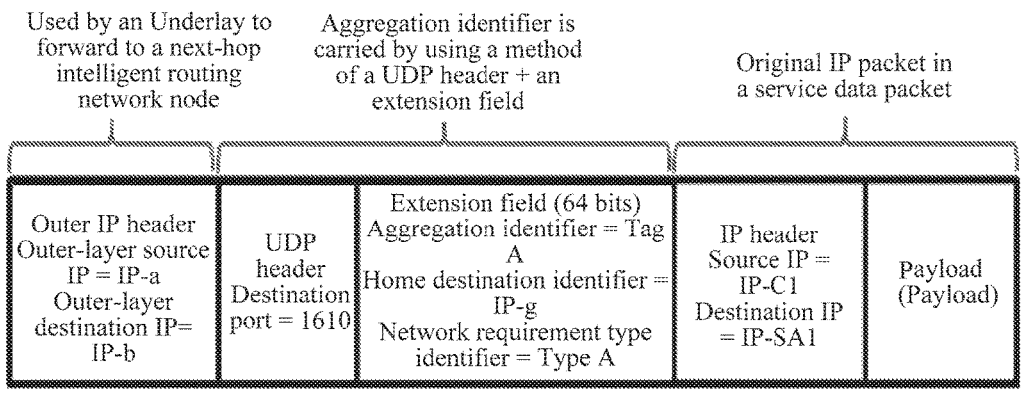
FIG. 3 is a schematic diagram of a packet format according to the first embodiment of the present disclosure.

Before forwarding is performed, as shown in FIG. 3, a UDP header and an extension field are added to the service data packet, and an outer-layer IP is encapsulated. A source address of the outer-layer IP is IP-a, and a destination address is IP-b. In this embodiment, the extension field (for example, 64 bits) of a UDP packet is used to carry the aggregation identifier. A destination port in the UDP packet is a port number (for example, 1610) specified by the intelligent routing network system, which indicates that the UDP header and the 64-bit extension field following the UDP header are used to carry an aggregation identifier. The aggregation identifier in the extension field is Tag A, a home destination identifier is IP-g, and a network requirement type identifier is Type A (a delay-sensitive type). An original IP packet in the service data packet follows the extension field.

After completing packet processing, the network node a sends the packet to a next hop node of the intelligent routing network system, that is, the network node b.

Step 6: After receiving the data packet from the network node a of the overlay network, the network node Y1 of the underlay network performs, based on an outer IP header (refer to FIG. 3), conventional IP routing and forwarding, and sends the packet to the network node b of the overlay network.

Step 7: After receiving the service data packet, the network node b determines that the network node b is an intermediate network node (for example, in this embodiment, if finding that a UDP destination port in the service data packet is 1610 and a home destination identifier IP-g is not an IP address of the network node b, the network node b determines that the network node b is an intermediate network node), then searches a forwarding table (refer to Table 5-b) of the network node b based on the aggregation identifier Tag A (IP-g+Type A) in the service data packet, and learns that next-hop information is IP-f; and modifies the source address of the outer-layer IP into IP-b and modifies the destination address into IP-f. After completing packet processing, the network node b sends the packet to a next hop node of the intelligent routing network system, that is, the network node f.

Step 8: Similar to step 6, the underlay network performs, based on the outer IP header, conventional IP routing and forwarding, and sends the packet to the network node f of the overlay network.

Step 9: After the network node f receives the service data packet, a processing process of the network node f is similar to that of the network node b, and a difference is that a source address of the outer-layer IP is IP-f and a destination address is IP-g. After completing packet processing, the network node f sends the packet to a next hop node of the intelligent routing network system, that is, the node f.

Step 10: Similar to step 6, the underlay network performs, based on the outer IP header, conventional IP routing and forwarding, and sends the packet to the network node of the overlay network.

Step 11: After receiving the service data packet, the network node g determines that the network node g is the last hop of the intelligent routing network system, removes the aggregation identifier (that is, the UDP header and the 64-bit extension field following the UDP header) in the service data packet, restores the service data packet to an original service data packet, and sends the original service data packet to the server node S1 of the online game service of the enterprise A.

Step 12: After receiving the data packet from the network node g of the overlay network, the network node Y of the underlay network performs, based on the IP header of the service data packet, conventional IP routing and forwarding, and sends the packet to the server node S1 of the online game service of the enterprise A.

Figure 4:
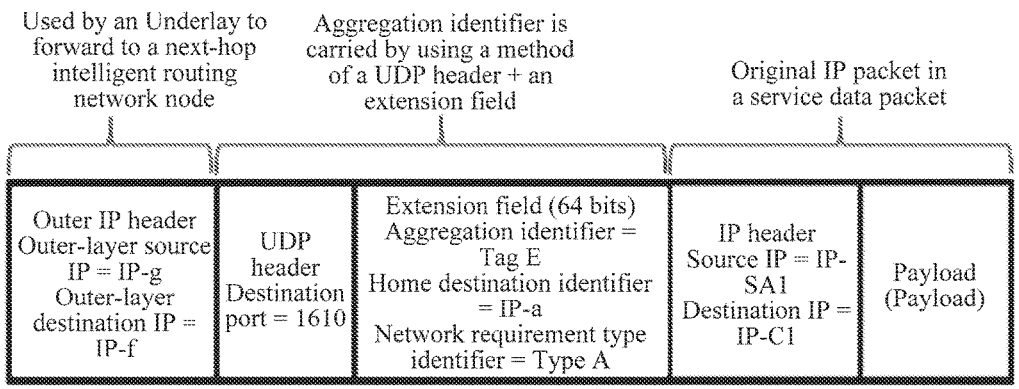
FIG. 4 is a schematic diagram of another packet format according to the first embodiment of the present disclosure.

Step 13: A process in which the network node S1 sends the data packet to the network node C1 via the intelligent routing network system is similar to steps 1 to 12. A difference is that a path "network node g-network node f-network node b-node a" is a preferable path, which meets a requirement that a home destination is the node a, of a delay-sensitive service within a current period in the intelligent routing network. The network node g is a first-hop network node. Based on a source IP address (which is IP-SA1 in this embodiment) in a service data packet and based on a network requirement aggregation mapping table (refer to Table 4-2) of the network node g, network requirement aggregation mapping is performed, an aggregation identifier Tag E is added to the data packet, and an outer IP header is encapsulated in an outer layer of the data packet, as shown in FIG. 4. The network node a, which is a last-hop network node, removes the aggregation identifier Tag E in the service data packet, and restores the service data packet to an original service data packet. The network node g, the network node f, and the network node b search forwarding tables (refer to Table 5-g, Table 5-f, and Table 5-b) based on the aggregation identifier Tag E extracted from the service data packet, so as to complete routing and forwarding.

Figure 5:
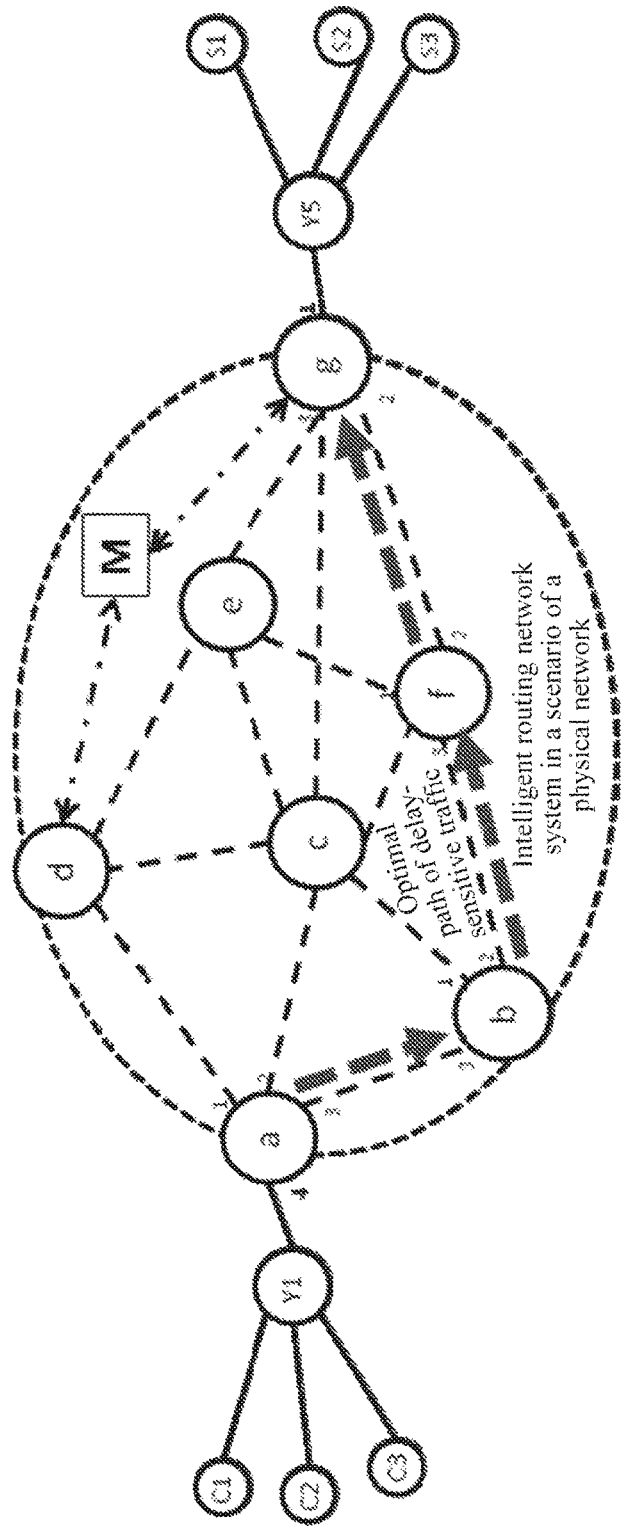
FIG. 5 is a schematic architectural diagram of a system according to a second embodiment of the present disclosure.

Referring to FIG. 5, FIG. 5 is a schematic architectural diagram of a system according to a second embodiment of the present disclosure, each network node in the intelligent routing network system is a physical network routing and forwarding device (for example, a router). Referring to FIG. 4, network nodes a, b, c, d, e, f, and g are intelligent routing network nodes, and a control entity M is a control entity on an overlay network. In this embodiment, the network node a and the network node g are edge network nodes, and the network nodes b, c, d, e, and f are intermediate network nodes. Network nodes C1, C2, and C3 are clients of an online game service of an enterprise A, and network nodes S1, S2, and S3 are servers of the online game service of the enterprise A. An IP address of the network node C is IP-C1, and an IP address of the network node S1 is IP-SA1. A data packet of the network node C1 needs to be sent to the network node S1 via the intelligent routing network system, and a data packet of the network node S1 needs to be sent to the network node C1 via the intelligent routing network system. Network nodes Y1 and Y5 are conventional IP network nodes.

Steps of the second embodiment of the present disclosure are as follows:

Step 1: The control entity M periodically collects real-time network statuses (for example, status information such as a network delay, a network packet loss, network jitter, and a network residual bandwidth between two network nodes) between intelligent routing network nodes, and stores the real-time network statuses in a database.

Step 2: The control entity M generates a network requirement aggregation mapping table, which is shown in Table 4, according to subscription information of a service, and delivers the network requirement aggregation mapping table to the edge network node a and the network node g. In this embodiment, a home destination identifier in an aggregation identifier Tag A is an IP address IP-g of the network node g.

Step 3: The control entity M periodically (for example, at intervals of ten minutes) calculates, according to the real-time network statuses between the intelligent routing network nodes, optimal or preferable paths meeting different types of service network requirements, and generates forwarding tables according to information about the optimal or preferable paths, and delivers the forwarding tables to the intelligent routing network nodes. The forwarding table includes an aggregation identifier and next-hop information corresponding to the aggregation identifier, where the aggregation identifier is used to identify service data flows of one type, where the service data flows have a same network requirement type and a same destination. The different types of service network requirements generally include a network delay-sensitive service, a network packet loss-sensitive service, a network jitter-sensitive service, a network residual bandwidth-sensitive service, and the like.

In this embodiment, as shown in FIG. 5, a path "network node a-network node b-network node f-network node g" is an optimal or a preferable path (a path having a relatively small delay), which satisfies a requirement that a server belongs to the network node g, of a delay-sensitive service within a current period in the intelligent routing network. A path "network node a-network node d-network node e-network node g" is an optimal or a preferable path (a path having a relatively small packet loss rate), which satisfies a requirement that a server belongs to the network node g, of a packet loss-sensitive service within a current period in the intelligent routing network.

In this embodiment, forwarding tables generated by the control entity M are exemplarily shown in Table 5-a, Table 5-b, Table 5-f, and Table 5-g. A forwarding table of another node is omitted.

Figure 6:
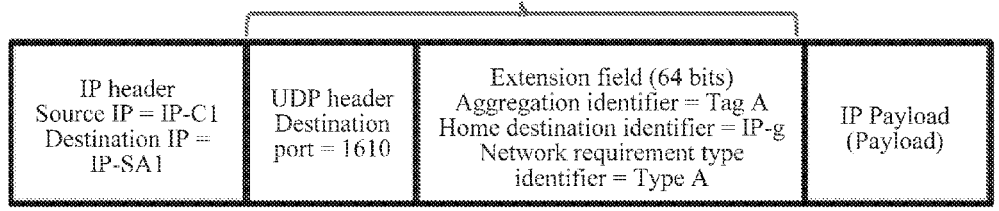
FIG. 6 is a schematic diagram of a packet format according to the second embodiment of the present disclosure.

Step 4: After receiving a service data packet, the network node a determines that the network node a is a first-hop network node of the intelligent routing network system, then searches a network requirement aggregation mapping table (refer to Table 4-1) of the network node a by using service flow feature information, for example, a destination IP address (IP-SA1) or a source IP address, in the service data packet, and finds that an aggregation identifier corresponding to the service data packet is Tag A; and then searches a forwarding table (refer to Table 5-a) based on the aggregation identifier Tag A, and learns that next-hop information is IP-b (actually, the physical network device searches for a corresponding physical port number based on the next hop IP-b, and as shown in FIG. 5, a physical port corresponding to the next hop IP-b to which the network node a sends the service data packet is a port 3). Before forwarding is performed, an aggregation identifier is added to the service data packet, as shown in FIG. 6. In this embodiment, a UDP header and an extension field (for example, 64 bits) are newly added after an IP header, to carry an aggregation identifier, as shown in FIG. 6. A destination port in the UDP packet is a port number (for example, 1610) specified by the intelligent routing network system, which indicates that the UDP header and the 64-bit extension field following the UDP header are used to carry an aggregation identifier. The aggregation identifier in the extension field is Tag A, a home destination identifier is IP-g, and a network requirement type identifier is Type A (a delay-sensitive type).

After completing packet processing, the network node a sends the packet from a corresponding physical port (for example, the port 3 of the network node a in this embodiment) to a next hop node of the intelligent routing network system, that is, the network node b.

Optionally, if the destination IP address in the service data packet cannot be found in the network requirement aggregation mapping table, the first-hop network node (for example, the network node a in this embodiment) of the intelligent routing network system performs conventional IP routing and forwarding on the data packet.

Step 5: After receiving the service data packet, the network node b determines that the network node b is an intermediate network node (for example, in this embodiment, if finding that a UDP destination Port in the service data packet is 1610 and a home destination identifier IP-g is not an IP address of the network node b, the network node b determines that the network node b is an intermediate network node), and then searches a forwarding table (refer to Table 5-b) of the network node b based on the aggregation identifier Tag A (IP-g+Type A) in the service data packet, and learns that next-hop information is IP-f; and finds, according to the next-hop information IP-f, that a physical port for sending the packet is a port 2, and sends the packet from the port 2 to a next hop node of the intelligent routing network system, that is, the network node f.

Step 6: After the network node f receives the service data packet, a processing process of the network node f is similar to that of the network node b. The network node f searches a forwarding table (refer to Table 5-b) of the network node f based on the aggregation identifier Tag A (IP-g+Type A) in the service data packet, learns that next-hop information is IP-g, and finds, according to the next-hop information IP-g, that a physical port for sending the packet is a port 2, and sends the packet from the port 2 to a next hop node of the intelligent routing network system, that is, the network node g.

Step 7: After receiving the service data packet and determining that the network node g is the last hop (for example, if determining, based on the aggregation identifier in the service data packet, that a home destination identifier IP-g included in the aggregation identifier is an IP address of the network node g, the network node g determines that the network node g is a last-hop network node) of the intelligent routing network system, the network node g removes the aggregation identifier (that is, the UDP header and the 64-bit extension field following the UDP header) in the service data packet, restores the service data packet to an original service data packet, and sends the original service data packet to the server node S1 of the online game service of the enterprise A.

Figure 7:
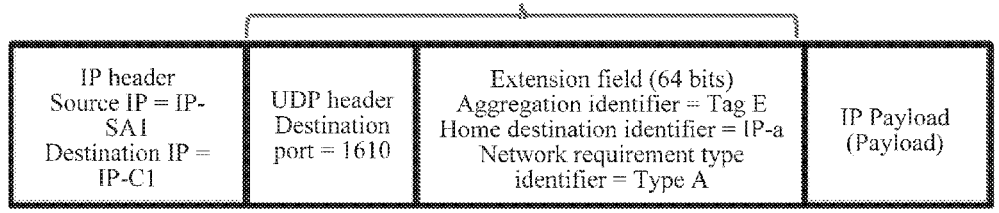
FIG. 7 is a schematic diagram of another packet format according to the second embodiment of the present disclosure.

Step 8: A process in which the node S1 sends the data packet to the network node C1 via the intelligent routing network system is similar to steps 1 to 7. A difference is that a path "network node g-network node f-network node b-network node a" is an optimal or a preferable path, which satisfies a requirement that a home destination is the network node a, of a delay-sensitive service within a current period in the intelligent routing network. The network node g is a first-hop network node. Based on a source IP address (which is IP-SA1 in this embodiment) in a service data packet and based on a network requirement aggregation mapping table (refer to Table 4-2) of the network node g, network requirement aggregation mapping is performed, and an aggregation identifier Tag E is added to the data packet, as shown in FIG. 7. The network node a, which is a last-hop network node, removes the aggregation identifier Tag E in the service data packet, and restores the service data packet to an original service data packet. The network node g, the network node f, and the network node b search forwarding tables (refer to Table 5-g, Table 5-f, and Table 5-b) based on the aggregation identifier Tag F extracted from the service data packet, so as to complete routing and forwarding.

Figure 8:
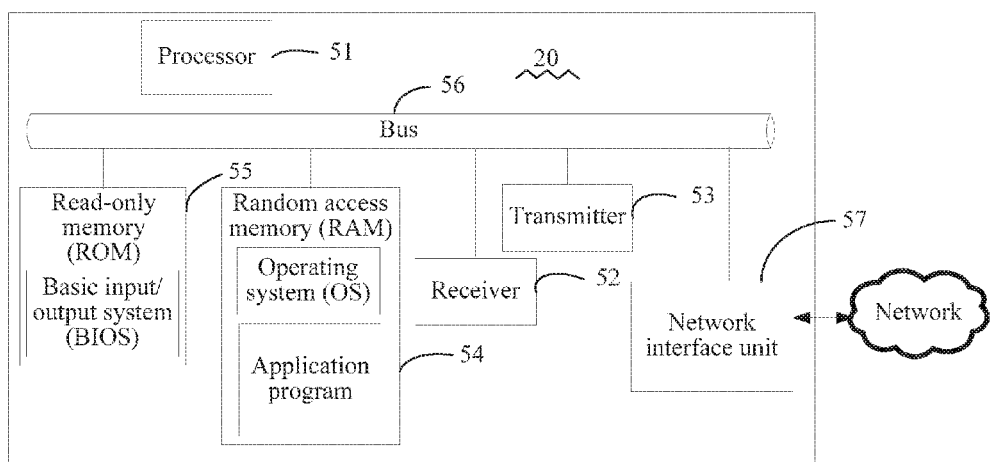
FIG. 8 is a schematic architectural diagram of still another implementation manner of a control entity according to the present disclosure.

Referring to FIG. 8, FIG. 8 is a schematic structural diagram of another implementation manner of a control entity according to the present disclosure. A control entity 20 includes a processor 51, a receiver 52, a transmitter 53, a random access memory 54, a read-only memory 55, a bus 56, and a network interface unit 57. The processor 51 is separately coupled to the receiver 52, the transmitter 53, the random access memory 54, the read-only memory 55, and the network interface unit 57 by using the bus 56. When needing to be run, the control entity is started by using a basic input/output system solidified in the read-only memory 55 or a bootloader booting system in an embedded system, to lead the control entity to enter a normal running state. After the control entity is in a normal running state, an application program and an operating system run in the random access memory 54, to receive data from a network or send data to a network, so that:

the receiver 52 is configured to receive real-time network status information between multiple intelligent routing network nodes;

the processor 51 is configured to generate a network requirement aggregation mapping table according to subscription information of a service, and calculate, according to the information about real-time network status between the intelligent routing network nodes, optimal or preferable paths meeting different types of service network requirements; and the transmitter 53 is configured to send information about the optimal or preferable paths to the intelligent routing network nodes, so that the intelligent routing network nodes can perform routing forwarding on a service data packet according to acquired next-hop information.

In this implementation manner, the processor 51 may be a central processing unit CPU or an application specific integrated circuit application-specific integrated circuit (ASIC), or may be configured as one or more integrated circuits that implement the implementation manner of this application.

According to this embodiment of the present disclosure, an optimal or a preferable path that is between two nodes in a system and meets various service network requirements is periodically dynamically determined. In this way, when performing routing, a network node searches a forwarding table based on an aggregation identifier, to acquire next-hop information, and performs routing and forwarding on a service data packet according to the acquired next-hop information. Therefore, a quantity of routing entries of a service routing node can be significantly reduced, operation complexity can be reduced, and routing and forwarding efficiency of a system can be improved.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed, in addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the Objectives of the solutions of the embodiments.

In addition, functional units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A routing method comprising:
    receiving, by a network node in an overlay network, a service data packet;
    searching, by the network node, a forwarding table according to an aggregation identifier associated with the service data packet to obtain next-hop information, wherein
    a) the aggregation identifier comprises a network requirement type identifier and a destination identifier comprising an IP address of an edge network node of the overlay network,
    b) the aggregation identifier is used to identify service data flows of one type,
    c) the network requirement type identifier identifies a network requirement type of the service data packet and the network requirement type comprises at least one of the following types: a network delay-sensitive type, a network packet loss-sensitive type, a network jitter-sensitive type, and a network residual bandwidth-sensitive type,
    d) the service data flows have a same network requirement type and a same destination, and
    e) the forwarding table comprises aggregation identifiers and the next-hop information corresponding to the aggregation identifiers; and
    forwarding, by the network node, the service data packet according to the obtained next-hop information.

2. The method according to claim 1, wherein before searching the forwarding table, the method further comprising:
    searching, by the network node, a network requirement aggregation mapping table according to service flow feature information of the service data packet, to obtain an aggregation identifier corresponding to the service flow feature information, when the network node determines that the network node is the first hop of an intelligent routing network system; and adding the obtained aggregation identifier to the service data packet.

3. The method according to claim 2, wherein adding the obtained aggregation identifier to the service data packet comprises:

adding the obtained aggregation identifier to an extension field of a User Datagram Protocol (UDP) packet.

4. The method according to claim 2, wherein the service flow feature information comprises at least one of a destination Internet Protocol (IP) address and a source IP address that are carried in the service data packet.

5. The method according to claim 1, wherein:

if the network node is an intermediate node between the first hop and the last hop of the intelligent routing network system, the service data packet received by the network node carries the aggregation identifier; and the searching, by the network node, a forwarding table comprises searching, by the network node, the forwarding table according to the aggregation identifier carried in the service data packet received by the network node, to obtain the next-hop information.

6. The method according to claim 1, wherein before receiving the service data packet, the method further comprising:

acquiring, by the network node, the forwarding table from a control entity.

7. The method according to claim 6, wherein acquiring the forwarding table from the control entity comprises one of:

obtaining, by the network node, the forwarding table periodically sent by the control entity; and requesting, by the network node, the control entity to send the forwarding table.

8. A method for controlling routing, the method comprising:

generating, by a control entity in an overlay network, a forwarding table comprising aggregation identifiers and next-hop information corresponding to the aggregation identifiers, wherein (a) each of the aggregation identifiers is used to identify service data flows of one type, (b) the service data flows have a same network requirement type and a same destination, (c) each of the aggregation identifier comprises a network requirement type identifier and a destination identifier comprising an IP address of an edge network node of the overlay network, (d) the network requirement type identifier is used to identify a network requirement type of the service data packet, and (e) the network requirement type comprises at least one of the following: a network delay-sensitive type, a network packet loss-sensitive type, a network jitter-sensitive type, and a network residual bandwidth-sensitive type; and sending, by the control entity, the forwarding table to a network node.

9. The method according to claim 8, wherein generating the forwarding table comprises:

periodically collecting, by the control entity, real-time network status information between multiple network nodes; and generating, by the control entity, the forwarding table according to the network status information.

10. In an overlay network, a network node comprising:
a processor;
a receiver configured to cooperate with the processor to receive a service data packet;
a forwarding table comprising aggregation identifiers and next-hop information corresponding to each of the aggregation identifiers,
wherein each of the aggregation identifiers in the forwarding table comprises a network requirement type identifier and a destination identifier and is used to identify service data flows of one type, which have a same network requirement type and a same destination comprising an IP address of an edge network node of the overlay network;
the processor configured to search the forwarding table according to an aggregation identifier associated with the service data packet to obtain next-hop information; and
a transmitter configured to cooperate with the processor to forward the service data packet according to the obtained next-hop information,
wherein the network requirement type comprises at least one of the following: a network delay-sensitive type, a network packet loss-sensitive type, a network jitter-sensitive type, and a network residual bandwidth-sensitive type.

11. The network node according to claim 10, wherein the processor is further configured to:

if the network node determines that the network node is the first hop of an intelligent routing network system, search a network requirement aggregation mapping table according to service flow feature information of the service data packet to obtain an aggregation identifier corresponding to the service flow feature information; and add the obtained aggregation identifier to the service data packet.

12. The network node according to claim 11, wherein adding the aggregation identifier to the service data packet comprises:

adding the obtained aggregation identifier to an extension field of a User Datagram Protocol (UDP) packet.

13. The network node according to claim 11, wherein the service flow feature information is carried in the service data packet and comprises at least one of a destination Internet Protocol (IP) address and a source IP address.

14. A control entity arranged in an overlay network in a centralized or distributed manner, the control entity comprising:

a processor;
a receiver configured to cooperate with the processor to collect real-time network status information between multiple network nodes;
the processor configured to generate a forwarding table according to the network status information;
the forwarding table comprising aggregation identifiers and next-hop information corresponding to the aggregation identifiers, wherein (a) each of the aggregation identifiers is used to identify service data flows of one type, (b) the service data flows have a same network requirement type and a same destination, (c) each of the aggregation identifiers comprises a network requirement type identifier and a destination identifier comprising an IP address of an edge network node of the overlay network, (d) the network requirement type identifier is used to identify a network requirement type of the service data flows, and (e) the network requirement type comprises at least one of the following: a network delay-sensitive type, a network packet loss-sensitive type, a network jitter-sensitive type, and a network residual bandwidth-sensitive type; and a transmitter configured to cooperate with the processor to send the forwarding table to a network node.

* * * * *